A. LEWIS.
APPARATUS FOR WASHING CARRIAGES.
No. 183,578. Patented Oct. 24, 1876.
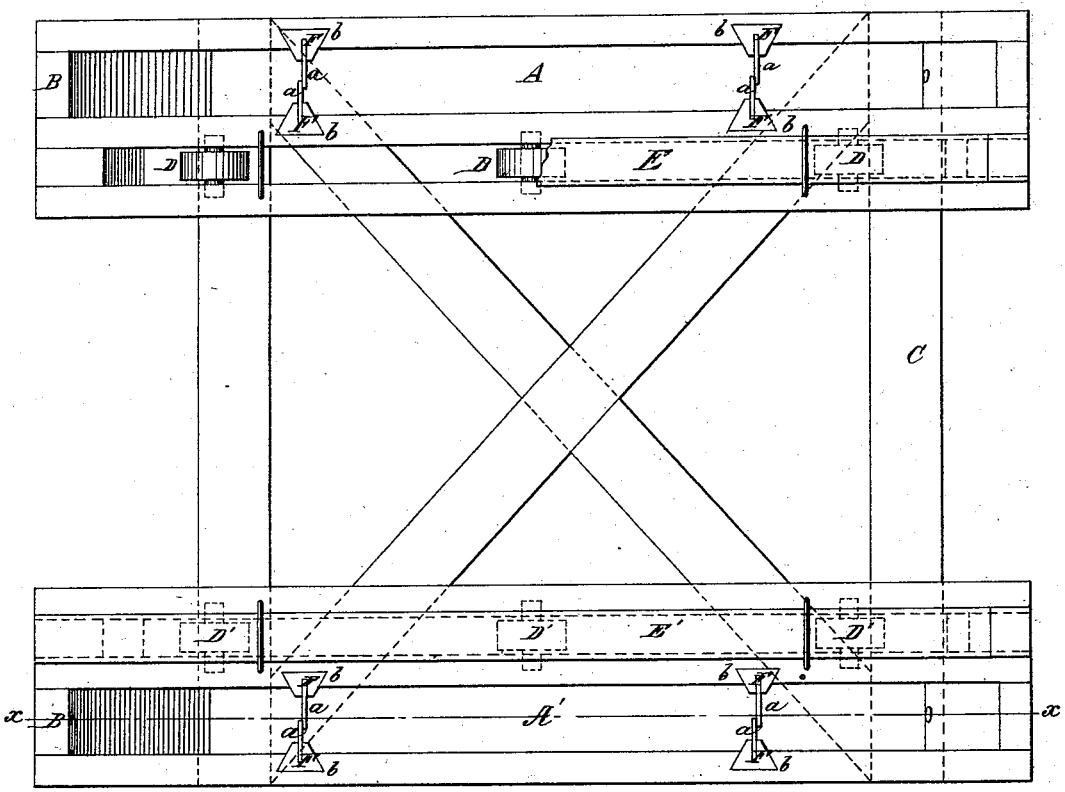
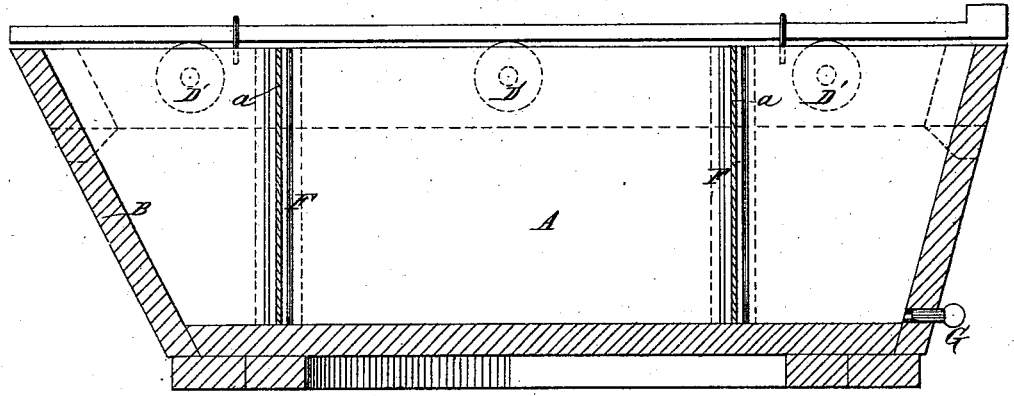
WITNESSES:
INVENTOR:
ATTORNEYS.

UNITED STATES PATENT OFFICE.

ANDREW LEWIS, OF SHELLSBURG, IOWA.

IMPROVEMENT IN APPARATUS FOR WASHING CARRIAGES.

Specification forming part of Letters Patent No. 183,578, dated October 24, 1876; application filed August 21, 1876.

*To all whom it may concern:*

Be it known that I, ANDREW LEWIS, of Shellsburg, in the county of Benton and State of Iowa, have invented a new and Improved Carriage-Washer, of which the following is a specification:

Figure 1 is a plan view. Fig. 2 is a longitudinal section on line $x\,x$, in Fig. 1.

Similar letters of reference indicate corresponding parts.

My invention consists in the arrangement of two tanks for holding water set upon a suitable frame, one for each side of the carriage, so that all the wheels may run in the water at once. It also consists of four spoke-rubbers, made of sheet rubber or other suitable material, placed in each tank, and also of a device consisting of a bar moving on a series of rollers at the side of each tank, for moving the carriage, when the wheels of the carriage swing clear in the tanks.

A A' are narrow tanks, which have inclined ends B, and are deep enough to allow the wheels of ordinary carriages to revolve in them when the axle rests on the upper edge of the tank. The tanks A A' are set upon a frame, C, so that the wheels on each side of a carriage may revolve in the tank. D D' are rollers at the side of the tanks, on which are placed the bars E E'. F are beveled bars of wood, having strips of rubber $a$ fastened on longitudinal grooves in the bars. The said bars are supported in dovetailed slots C in the sides of the tank, so that two of them come opposite each other at the center of each wheel. G is a plug for drawing the water from the tank.

Brushes may be used to advantage instead of the strips of rubber.

I have described my improvement as being attached to a frame; but if it is of no special advantage to have it portable, the tank may be placed in the carriage-house floor.

A carriage to be washed is let down so that the axles rest on the bars E E', and the wheels revolve freely in the tanks. By turning them, the spokes and fellies come in contact with the rubbers, which detach the mud. The position of the carriage may be easily shifted by moving the bars E E'.

Having thus described my invention, I claim as new and desire to secure by Letters Patent—

1. The combination of the tank A and rubber strips $a$, supported by the bar F in the slot $b$, substantially as shown and described.

2. The combination of the tank A, rollers D, and bar E, substantially as shown and described.

3. The combination of the tanks A A', rubber strips $a$, bars F, rollers D D', and frame C, as shown and described.

ANDREW LEWIS.

Witnesses:
 ELISHA RUNYON,
 WILLIAM CARNEY.